United States Patent
Kim et al.

(10) Patent No.: US 12,306,780 B2
(45) Date of Patent: May 20, 2025

(54) CENTRALIZED STORAGE DEVICE, IN-VEHICLE ELECTRONIC SYSTEM INCLUDING THE SAME, AND METHOD OF OPERATING THE SAME

(71) Applicant: SAMSUNG ELECTRONICS CO., LTD., Suwon-si (KR)

(72) Inventors: Insup Kim, Suwon-si (KR); Ganggyu Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 18/204,579

(22) Filed: Jun. 1, 2023

(65) Prior Publication Data

US 2024/0168905 A1 May 23, 2024

(30) Foreign Application Priority Data

Nov. 18, 2022 (KR) .................. 10-2022-0155073

(51) Int. Cl.
*G06F 13/38* (2006.01)
*G06F 13/10* (2006.01)
*G06F 13/18* (2006.01)

(52) U.S. Cl.
CPC .......... *G06F 13/387* (2013.01); *G06F 13/105* (2013.01); *G06F 13/18* (2013.01)

(58) Field of Classification Search
CPC ....... G06F 13/387; G06F 13/105; G06F 13/18
See application file for complete search history.

(56) References Cited

U.S. PATENT DOCUMENTS

| 10,235,198 B2 | 3/2019 | Qiu et al. |
| 10,300,923 B2 | 5/2019 | Luebben et al. |
| 10,467,037 B2 | 11/2019 | Choi et al. |
| 10,558,376 B2 * | 2/2020 | Hahn ................ G06F 3/0679 |

(Continued)

FOREIGN PATENT DOCUMENTS

| CN | 103308932 A | * 9/2013 | |
| CN | 112513804 A | * 3/2021 | ........... G06F 3/0619 |

(Continued)

OTHER PUBLICATIONS

Translation for CN-112513804-A (Year: 2021).*

(Continued)

*Primary Examiner* — Henry Tsai
*Assistant Examiner* — John B Roche
(74) *Attorney, Agent, or Firm* — Sughrue Mion, PLLC

(57) ABSTRACT

The present disclosure provides methods, apparatuses, and systems for centralized storage devices. In some embodiments, an in-vehicle electronic system includes a centralized storage device, and an interface switch coupled to the centralized storage device through a first interface, coupled to at least one domain control unit (DCU) through a first vehicle communication interface, and coupled to at least one electronic control unit (ECU) through a second vehicle communication interface. The interface switch includes an interface circuit configured to communicate according to the first interface, and an interface converter configured to convert the first vehicle communication interface into the first interface and to convert the second vehicle communication interface into the first interface.

20 Claims, 17 Drawing Sheets

(56) References Cited

U.S. PATENT DOCUMENTS

| | | |
|---|---|---|
| 10,706,002 B2 | 7/2020 | Troia |
| 10,958,576 B2 | 3/2021 | Joshi et al. |
| 11,080,208 B2 | 8/2021 | Olarig et al. |
| 11,119,970 B2 | 9/2021 | Troia |
| 11,228,496 B2 | 1/2022 | Fang et al. |
| 11,397,607 B2 | 7/2022 | Hwang |
| 11,409,469 B2 | 8/2022 | Jo et al. |
| 11,411,823 B2 | 8/2022 | Fang et al. |
| 2008/0288954 A1* | 11/2008 | Fuchs .................... H04L 67/55 719/310 |
| 2018/0275905 A1 | 9/2018 | Olarig |
| 2019/0296937 A1 | 9/2019 | Kern et al. |
| 2020/0293465 A1 | 9/2020 | Yang et al. |
| 2021/0144207 A1 | 5/2021 | Yasay et al. |
| 2021/0357351 A1 | 11/2021 | Gepp et al. |
| 2022/0231917 A1 | 7/2022 | Fang et al. |

FOREIGN PATENT DOCUMENTS

| | | | | |
|---|---|---|---|---|
| CN | 109669622 B | * | 4/2022 | ............ G06F 3/0611 |
| CN | 115080993 A | * | 9/2022 | |
| CN | 115510486 A | * | 12/2022 | ............ G06F 21/33 |
| KR | 10-2018-0072340 A | | 6/2018 | |
| KR | 10-2018-0072342 A | | 6/2018 | |
| KR | 10-2018-0108417 A | | 10/2018 | |

OTHER PUBLICATIONS

Translation of CN-109669622-B (Year: 2022).*
Translation of CN-115080993-A (Year: 2022).*
Translation of CN-115510486-A (Year: 2022).*
Translation of CN-103308932-A (Year: 2013).*
Communication issued Apr. 5, 2024 by the European Patent Office in European Patent Application No. 23184619.7.
Kim, Insup et al., "Cybersecurity and Capacity Requirement for Data Storage of Autonomous Driving System", 2022 IEEE 96th Vehicular Technology Conference (VTC2022-Fall), IEEE, Sep. 26, 2022. (7 pages total).
Victor Bandur et al., "Making the Case for Centralized Automotive E/E Architectures", IEEE Transactions on Vehicular Technology, vol. 70, No. 2, Feb. 2021, 16 pages.
"Road vehicles—Cybersecurity engineering", ISO/SAE 21434:2021(E), Aug. 2021, 88 pages.

* cited by examiner

| In-Vehicle COMM | Requirement |
|---|---|
| CAN | Low Security, Low Speed |
| Ethernet | High Security, High Speed |

| Priority | Vehicle Data Type |
|---|---|
| 1 | AV |
| 2 | Driving ECU |
| 3 | Navigation |
| 4 | Gateway ECU |
| 5 | EDR |
| 6 | Infotainment |

FIG. 5B

| Security Level | Storage Target |
|---|---|
| High | Media redundancy |
| Medium | SLC/TLC redundancy |
| Low | TLC redundancy |
| Not relevant | No redundancy |

FIG. 5C

| Category | Item Definition | | | Security | | |
|---|---|---|---|---|---|---|
| | Data Type | Example | NVM storage required? | Frequency(Hot /Cold/Archive) | Level | Comments |
| Conventional In-vehicle | Driver input | Accel. Pedal/ Brake pedal(EDR-purpose) | O | Hot | Moderate | EDR |
| | MCU SW | Engine controller SW | X | Cold | High | |
| | Vehicle operation | vehicle speed | O | Hot | Moderate | EDR |
| | Diagnostics Data | Engine fault | O | Archive | Low | |
| ADS In-vehicle | Camera sensor | Front camera | O | Hot | Low | |
| | Other ADS sensor | Lidar, Radar | X | Hot | Low | |
| | AV SW interim data | Detection bounding box | △ | Hot | Low | |
| | AV SW configuration data | Machine leaning parameters | △ | Cold | High | |
| | AV SW | Detection/ Decision/ Sensor fusion algorithm | O | Cold | High | |
| Telematics | GPS | Longituge data | O | Hot | Moderate | Privacy |
| | HD map | 3D high definition map | O | Cold | High | Safety |
| | Driver monitoring | Cabin camera, Drivers iris | O | Hot | Moderate | Privacy |
| ADS/ADAS monitoring | V2V monitoring | Front car status | O | Hot | Moderate | |
| | V2P monitoring | Pedestrian status | X | Cold | Moderate | |
| | V2I monitoring | Infrastructure status(e.g. traffic light) | O | Cold | Moderate | |
| Infotainment | Application | SNS, eCommerce | O | Cold | Low | |
| | Gaming | – | O | Hot | Low | |
| | Video/Audio streaming | – | O | Hot | Low | |
| | VR / AR | – | X | Hot | Low | |
| Personal data | Personal setting | memory seat, IVI setting | O | Cold | Low | |
| | Crytographic | Virtual Key, Face recognition | O | Cold | High | Privacy / Security |
| SSD-related | SSD Firmware | – | – | – | High | |
| | SSD Firmware update | Firmware update package | – | – | High | |
| | SSD internal data | SSD monitoring data | – | – | High | |
| | Communication data | PCIe-PCIE switch data SR-IOV? | – | – | High | |
| | SSD Crytographic | Secure boot key | – | – | High | |

FIG. 9

CENTRALIZED STORAGE DEVICE, IN-VEHICLE ELECTRONIC SYSTEM INCLUDING THE SAME, AND METHOD OF OPERATING THE SAME

CROSS-REFERENCE TO RELATED APPLICATIONS

This application claims benefit of priority under 35 U.S.C. § 119 to Korean Patent Application No. 10-2022-0155073, filed on Nov. 18, 2022, in the Korean Intellectual Property Office, the disclosure of which is incorporated by reference herein in its entirety.

BACKGROUND

1. Field

The present disclosure relates generally to storage devices, and more particularly, to a centralized storage device, an in-vehicle electronic system including the same, and a method of operating the same.

2. Description of Related Art

A storage device including a non-volatile memory device may be used in electronic devices such as, but not limited to, a universal serial bus (USB) drive, a digital camera, a mobile phone, a smartphone, a tablet, a personal computer (PC), a memory card, a solid state drive (SSD), and the like. For example, storage devices may be used to store and/or transfer large amounts of data. Recently, storage devices may have been miniaturized and may have been implemented in an embedded form in electronic devices.

SUMMARY

The present disclosure provides a centralized storage device supporting multiple vehicle communication interfaces, an in-vehicle electronic system having the centralized storage device, and a method of operating the centralized storage device.

According to an aspect of the present disclosure, an in-vehicle electronic system is provided. The in-vehicle electronic system includes a centralized storage device, and an interface switch coupled to the centralized storage device through a first interface, coupled to at least one domain control unit (DCU) through a first vehicle communication interface, and coupled to at least one electronic control unit (ECU) through a second vehicle communication interface. The interface switch includes an interface circuit configured to communicate according to the first interface, and an interface converter configured to convert the first vehicle communication interface into the first interface and to convert the second vehicle communication interface into the first interface.

According to an aspect of the present disclosure, a centralized storage device is provided. The centralized storage device includes at least one non-volatile memory (NVM) device, and a controller configured to control the at least one NVM device. The controller is further configured to receive, through a single root-input output virtualization (SR-IOV) function, first data from at least one ECU coupled to respective interfaces of a plurality of vehicle communication interfaces. The controller is further configured to transmit, through the SR-IOV function, second data to the at least one ECU coupled to the respective interfaces of the plurality of vehicle communication interfaces. The controller is coupled to an external device through an NVM express (NVMe) interface.

According to an aspect of the present disclosure, a method of operating a centralized storage device is provided. The method includes determining a type of vehicle data corresponding to a memory access request received from an external device through to a first interface. The memory access request includes at least one of a read request and a write request. The method further includes executing a memory access operation according to a priority corresponding to the type of the vehicle data. The type of vehicle data includes at least one of autonomous driving-related data, driving electronic control unit-related data, navigation data, gateway electronic control unit-related data, event data recorder (EDR) data, and infotainment data.

According to an aspect of the present disclosure, a storage device is provided. The storage device includes at least one NVM device, a controller configured to control the at least one NVM device, and an in-vehicle interface circuit coupled to an external device through a vehicle communication interface. The controller is further configured to process vehicle data according to a priority corresponding to the vehicle communication interface. The vehicle communication interface includes at least one of a controller area network (CAN) interface, a CAN with flexible data rate (CAN-FD) interface, a local interconnect network (LIN) interface, a FlexRay interface, a media oriented systems transport (MOST) interface, and an Ethernet interface.

According to an aspect of the present disclosure, an in-vehicle electronic system is provided. The in-vehicle electronic system includes a storage device including at least one NVM device, a controller configured to control the at least one NVM device, and an interface switch coupled to the storage device through a first interface, coupled to at least one first vehicle controller through a first vehicle communication interface, and coupled to at least one second vehicle controller through a second vehicle communication interface.

Additional aspects are set forth in part in the description which follows and, in part, may be apparent from the description, or may be learned by practice of the presented embodiments.

BRIEF DESCRIPTION OF DRAWINGS

The above and other aspects, features, and advantages of certain embodiments of the present disclosure may be more apparent from the following description, taken in conjunction with the accompanying drawings, in which:

FIG. 4 is a flowchart illustrating a method of operating a centralized storage device 100, according to an embodiment;

FIGS. 5A, 5B, and 5C are diagrams illustrating data management policies of the centralized storage device 100, according to an embodiment;

FIG. 9 is a diagram illustrating requirements according to sources of vehicle data in a vehicle network, according to an embodiment;

DETAILED DESCRIPTION

Figure 1:
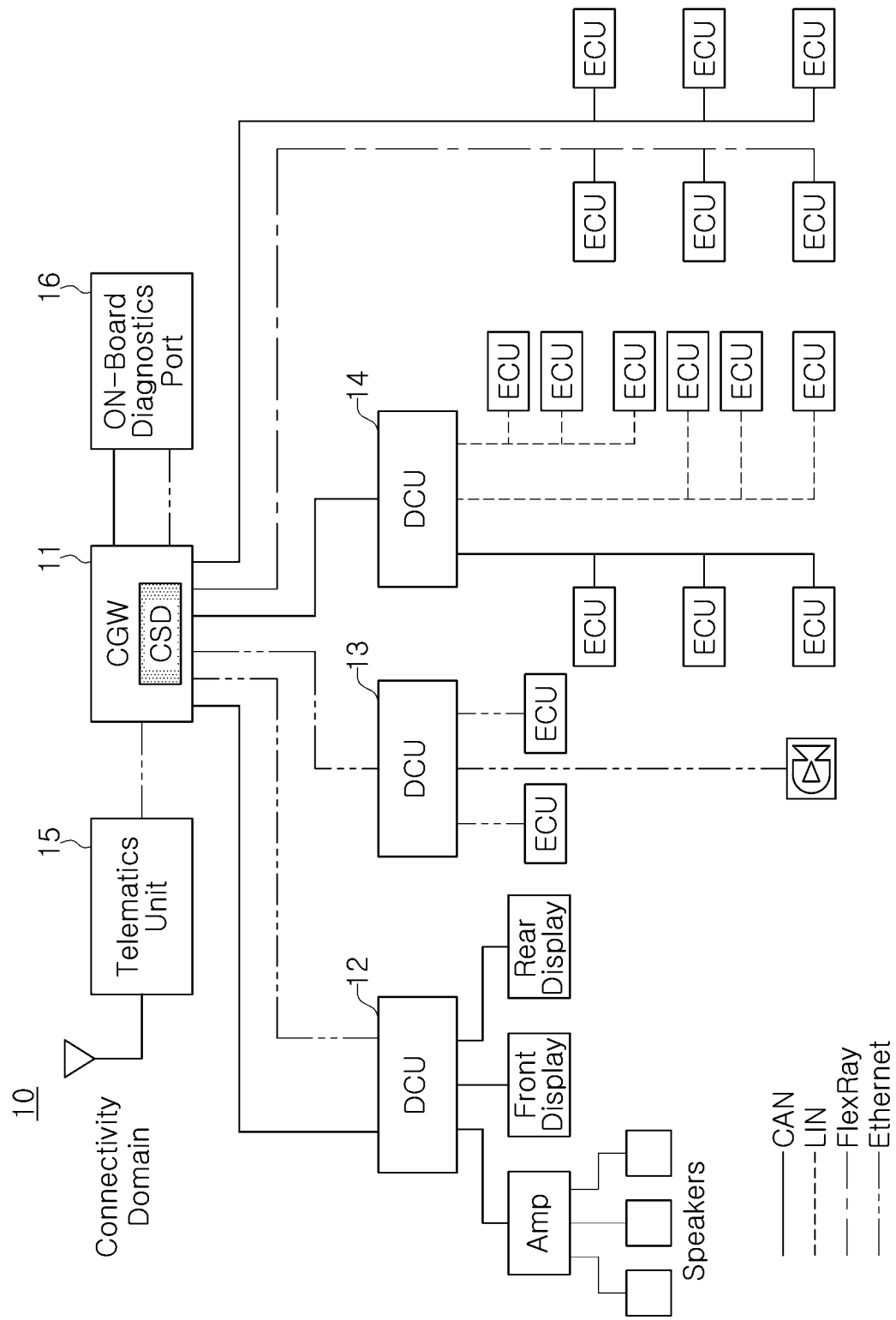
FIG. 1 is a diagram illustrating an in-vehicle communication network, according to an embodiment.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art are to recognize that various changes and modifications of the embodiments described herein can be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It is to be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The terms "upper," "middle", "lower", etc. may be replaced with terms, such as "first," "second," third" to be used to describe relative positions of elements. The terms "first," "second," third" may be used to described various elements but the elements are not limited by the terms and a "first element" may be referred to as a "second element". Alternatively or additionally, the terms "first", "second", "third", etc. may be used to distinguish components from each other and do not limit the present disclosure. For example, the terms "first", "second", "third", etc. may not necessarily involve an order or a numerical meaning of any form.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Hereinafter, embodiments of the present disclosure are described with reference to the accompanying drawings.

As autonomous vehicles have been developed, the importance of computational speed and data processing may have increased, for example. To process images and/or data from sensors (e.g., light detection and ranging (LiDAR) and/or radar) in real time, existing distributed electrical and/or electronic (E/E) structures may have been converted into centralized and/or a zone E/E structures. For another example, a server in a data center may need powerful computing units and/or additional data storage devices. That is, in order to support the centralized architecture of autonomous vehicles, implementation of a centralized storage device, by integrating existing distributed data storage devices, for example, may be necessary. For example, the centralized storage device may support a single root input/output (I/O) virtualization (SR-IGV) to support multiple hosts (e.g., vehicle controllers). Alternatively or additionally, the centralized storage device may support vehicle interfaces such as, but not limited to, Ethernet and controller area network (CAN), for direct connection to the vehicle network. In addition, demand for vehicle cyber security for increasing safety and/or security of vehicle communications may have similarly increased. Thereby, further increasing a need for a centralized storage device.

A centralized storage device, an in-vehicle electronic system having the centralized storage device, and/or a method of operating the centralized storage device provided by the present disclosure may apply a data transfer protocol, a read/write (R/W) priority, and/or differentiated redundancy to satisfy the cyber security of autonomous vehicle data and/or performance of standardized vehicle data.

A centralized storage device, an in-vehicle electronic system having the centralized storage device, and/or a method of operating the centralized storage device provided by the present disclosure may include a plurality of interfaces supporting Ethernet communication and/or CAN communication (e.g., SR-IOV). Alternatively or additionally, the centralized storage device may optimally select an interface and storage policy according to data characteristics. For example, the centralized storage device, the in-vehicle electronic system having the centralized storage device, and/or the method of operating the centralized storage device may be implemented using a smart solid state drive (SSD) implemented with SR-IOV that may include a Non-Volatile Memory express (NVMe) over Fabrics (NVMe-oF) interface and/or a CAN interface supporting vehicle Ethernet communication. That is, the centralized storage device may satisfy autonomous driving data requirements by differentiating networks according to vehicle data characteristics (e.g., security and speed).

In an embodiment, data requiring low security and/or low speed (e.g., vehicle diagnostic data, or the like) may use a CAN interface. In an optional or additional embodiment, data (e.g. autonomous vehicle (AV) sensor data, high definition (HD) maps) requiring high security and/or high speed may use the Ethernet interface. For example, in a case of an SR-IOV interface connected to a plurality of controllers (e.g., electronic control units (ECUs)), the centralized storage device may prioritize data read/write operations by assigning a priority to each interface For example, the centralized storage device may generate and/or assign priorities in a highest priority level to a lowest priority level, such as, AV (e.g., highest priority level), driving ECU (e.g., motor/battery), navigation, gateway ECU, event data recorder (EDR), and infotainment (e.g., lowest priority level).

Alternatively or additionally, the centralized storage device may differentiate between data storage devices by considering availability and/or integrity among cyber security characteristics. In an embodiment, when a high security level is required, the centralized storage device may perform media redundancy. For example, when a medium security level is required, Single Level Cell (SLC) and/or Triple Level Cell (TLC) redundancy of the centralized storage device may be performed. Alternatively or additionally, when a low security level is required, TLC redundancy may be performed. In another example, when a special security level is not required (e.g., security may not be relevant), the centralized storage device may prevent performing redundancy (e.g. no redundancy).

FIG. 1 is a diagram illustrating an in-vehicle communication network, according to an example embodiment. Referring to FIG. 1, the in-vehicle communication network 10 may include a central gateway (CGW) 11, a plurality of domain control units (DCU) (e.g., first DCU 12, second DCU 13, and third DCU 14), a communication (e.g., telematics) unit 15, and a diagnostic port 16.

The central gateway 11 may be connected to at least one DCU and/or at least one ECU through various vehicle communication interfaces. The vehicle communication interfaces may include, but not be limited to, CAN, CAN with flexible data rate (CAN-FD), local interconnect network (LIN), FlexRay, media oriented systems transport (MOST), automotive Ethernet, and the like.

In an embodiment, the central gateway 11 may include a centralized storage device CSD configured to store data managed by the in-vehicle communication network 10. In an embodiment, the centralized storage device CSD may be configured to transfer data (e.g., input data, output data) between a plurality of hosts (e.g., DCUs, ECUs, communication unit 15, external devices, or the like) through various vehicle communication interfaces. Alternatively or additionally, the centralized storage device CSD may be configured to support the SR-IOV function. For example, the SR-IOV function may include physical functions (PF) and/or virtual functions (VF).

As described herein, a domain control unit (e.g. first DCU 12, second DCU 13, and/or third DCU 14) may refer to an ECU that may correspond to and/or may be communicatively coupled with the central gateway 11. The in-vehicle communication network 10 may include various domains such as, but not limited to, powertrain, chassis, body, infotainment, and the like. In some embodiments, an ECU may be present under each of the domain control units 12, 13, and 14. That is, at least one ECU may be present (e.g., communicatively coupled) in a domain control unit and/or may transmit information from individual sensors. Alternatively or additionally, a domain control unit may operate as one ECU. That is, the ECU group (or DCU) may correspond to a grouping of highly-related ECUs. The ECUs belonging to the ECU group may be connected to sensors related to a domain of the in-vehicle communication network 10 (e.g., engine/powertrain, transmission). For example, each ECU of the ECU group may be configured to transmit and/or receive information to and/or from a corresponding sensor related to the domain of the ECU group.

The number and arrangement of components of the in-vehicle communication network 10 shown in FIG. 1 are provided as an example. In practice, there may be additional components, fewer components, different components, and/or differently arranged components than those shown in FIG. 1. Furthermore, two or more components shown in FIG. 1 may be implemented within a single component, or a single component shown in FIG. 1 may be implemented as multiple, distributed components. Alternatively or additionally, a set of (one or more) components shown in FIG. 1 may be integrated with each other and implemented as an integrated circuit, as software, and/or a combination of circuits and software. That is, the in-vehicle communication network 10 may be implemented using various combinations of various domain control units, various vehicle communication networks, and various electronic control units without departing from the scope of the present disclosure.

The communication unit 15 may be configured to communicate with devices within the vehicle and/or an external devices outside of the vehicle. For example, the communication unit 15 may be configured to communicate with an external device through a wireless interface.

The diagnostic port 16 may include an on-board diagnostic terminal for vehicle diagnostics. The diagnostic port 16 may be managed as an access control list to block malicious access. The diagnostic port 16 may be connected to the central gateway 11 through a plurality of vehicle communication interfaces (e.g., CAN and Ethernet interfaces).

The in-vehicle communication network 10, in an example embodiment, may include a centralized storage device CSD that may support a plurality of vehicle communication interfaces, such that performance of data reading and/or writing may be improved. Alternatively or additionally, cyber security performance and/or overall system performance may be improved.

Figure 2A:
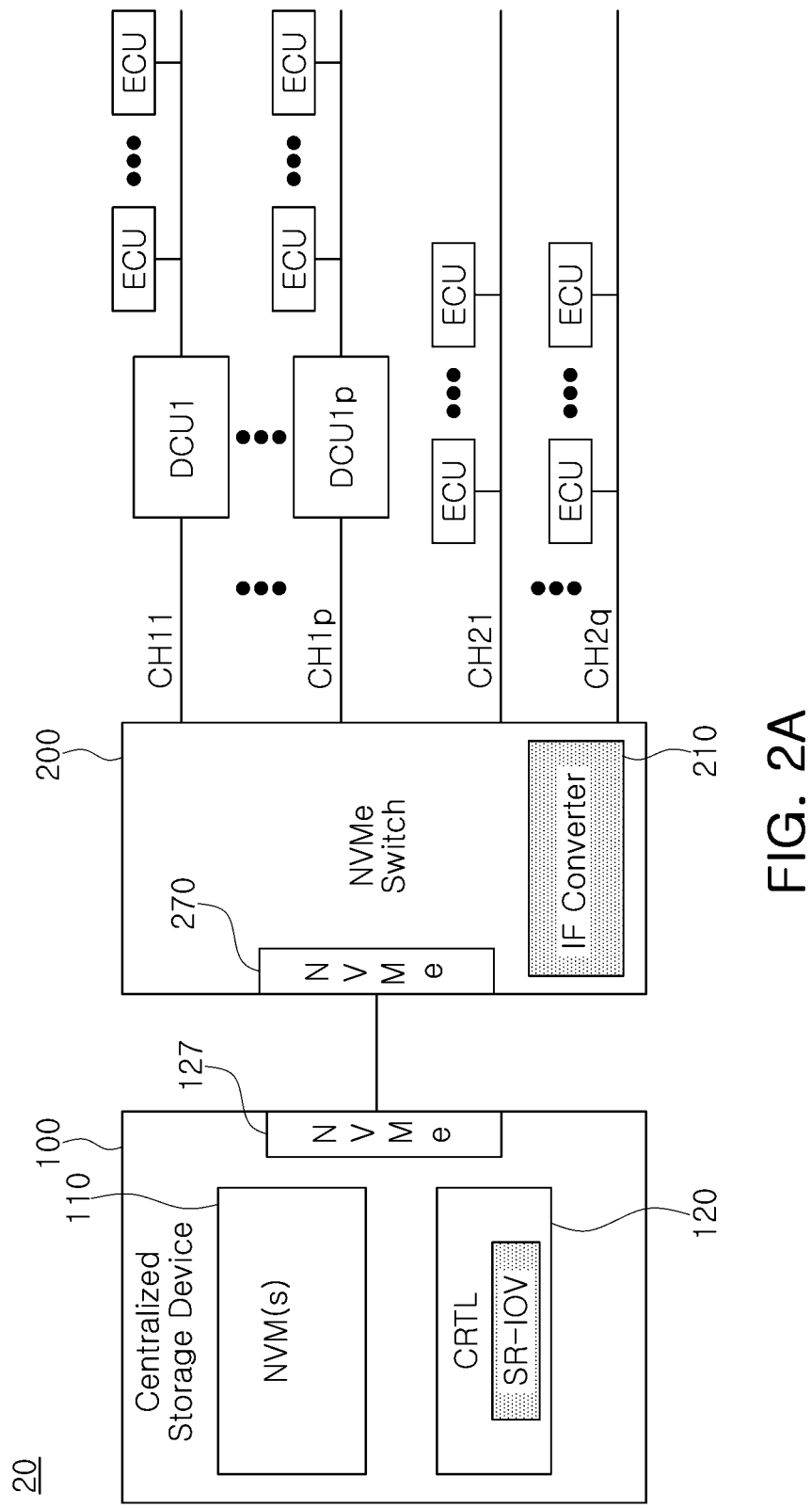
FIG. 2A is a diagram illustrating an in-vehicle electronic system, according to an embodiment.

FIG. 2A is a diagram illustrating an in-vehicle electronic system 20, according to an example embodiment. Referring to FIG. 2A, the in-vehicle electronic system 20 may include a centralized storage device 100, an interface switch 200, first channels CH11-CH1p (where p is an integer greater than or equal to 2), and second channels CH21-CH2q (where q is an integer greater than or equal to 2). The in-vehicle electronic system 20 of FIG. 2A may include or may be similar in many respects to the in-vehicle communication network 10 described above with reference to FIG. 1, and may include additional features not mentioned above.

The centralized storage device 100 may include at least one non-volatile memory (NVM(s)) device 110 and a controller (CRTL) 120.

At least one non-volatile memory device 110 may be configured to store data. For example, the non-volatile memory device 110 may include, but not be limited to, a NAND flash memory, a vertical NAND (VAND) flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), and the like. Hereinafter, for ease of description, the non-volatile memory device 110 may be referred to as a VNAND flash memory device.

In an embodiment, the controller 120 may be connected (e.g., communicatively coupled) to at least one non-volatile memory device 110 through a plurality of control pins for transmitting control signals (e.g., command-latch enable (CLE), address-latch enable (ALE), chip enables (CEs), write enables (WEs), read enables (REs), and the like). Alternatively or additionally, the controller 120 may be configured to control the non-volatile memory device 110 using the control signals (e.g., CLE, ALE, CEs, WEs, REs, or the like). For example, the non-volatile memory device 110 may perform a program operation, a read operation, and/or an erase operation by latching a command CMD and/or an address ADD at the edge of a write enable WE signal in response to a command latch enable CLE signal and an address latch enable ALE signal. For another example, during a read operation, the chip enable signal CE may be activated, the CLE may be activated during a command transmission period, ALE may be activated during an address transmission period, and RE may be toggled in a period in which data is transmitted through the data signal line DQ. In such an example, the data strobe signal DQS may be toggled at a frequency corresponding to the data input/output speed. In an embodiment, read data may be transmitted in sequence and in synchronization with the data strobe signal DQS.

In an embodiment, the controller 120 may be configured to control overall operations of the centralized storage device 100. That is, the controller 120 may perform various management operations such as, but not limited to, cache/buffer management, firmware management, garbage collection management, wear leveling management, data deduplication management, read refresh/reclaim management, bad block management, multi-stream management, mapping of host data and non-volatile memory management, quality of service (QoS) management, system resource allocation management, non-volatile memory queue management, read level management, erase/program management, hot/cold data management, power loss protection management, dynamic thermal management, initialization management, and redundant array of inexpensive disks (RAID) management.

In an embodiment, the controller 120 may be configured to perform a SR-IOV function to provide a multi-host service. U.S. Pat. Nos. 10,235,198, 10,467,037, 11,397,607, and 11,409,469 disclose the functionality of the SR-IOV interface, the disclosures of which are incorporated by reference herein in their entireties.

The controller 120 may include an interface circuit 127 for communicating with an external device through a first interface. For example, the first interface may include a NVMe interface. However, the first interface is not limited thereto. For example, the first interface may include, but not be limited to, Peripheral Component Interconnect express (PCIe), Serial Advanced Technology Attachment (SATA), Small Computer System Interface (SCSI), serial attached SCSI (SAS), universal storage bus (USB) attached SCSI (UAS), internet small computer system interface (iSCSI), fiber channel (FC), FC over Ethernet (FCoE), and the like.

The interface switch 200 may be connected to the centralized storage device 100 through a first interface. The interface switch 200 may include an interface converter 210 and a storage interface circuit 270.

The interface converter 210 may convert a vehicle communication interface (e.g., CAN/LIN/FlexRay/Ethernet, or the like) into a first interface (e.g., NVMe) and/or may convert the first interface into the vehicle communication interface. In some embodiments, the interface converter 210 may include interface conversion units corresponding to each of a plurality of vehicle communication interfaces. Alternatively or additionally, each of the respective interface conversion units may operate as a virtual host.

The storage interface circuit 270 may communicate with the controller 120 through a first interface. Alternatively or additionally, the interface switch 200 may be connected to at least one DCU and/or at least ECU through at least one vehicle communication interface (e.g., CAN/LIN/FlexRay/Ethernet, or the like). For example, the interface switch 200 may be connected to domain control units DCU1-DCUp corresponding to each of the first channels CH11-CH1p. At least one electronic control unit ECU may be connected to each of the domain control units DCU1-DCUp. Each of the first channels CH11-CH1p may transmit and/or receive data according to a vehicle communication interface (e.g., CAN/LIN/FlexRay/Ethernet, or the like). Alternatively or additionally, the interface switch 200 may be connected to at least one electronic control unit ECU via respective second channels CH21-CH2q. Each of the second channels CH21-CH2q may transmit and/or receive data according to a vehicle communication interface (e.g., CAN/LIN/FlexRay/Ethernet, or the like).

The in-vehicle electronic system 20 in an example embodiment that may optimize data transmission by distinguishing data communication (e.g., Ethernet vs. CAN) in consideration of characteristics of standardized vehicle data. For example, when the in-vehicle electronic system 20 includes SR-IOVs connected to a plurality of vehicle controllers, priority may be provided in advance according to the importance of data and, consequently, data read/write RW performance may be optimized. Alternatively or additionally, the in-vehicle electronic system 20 may improve cyber security and vehicle performance by discerning a data storage strategy in consideration of availability/integrity of autonomous driving data.

Figure 2B:
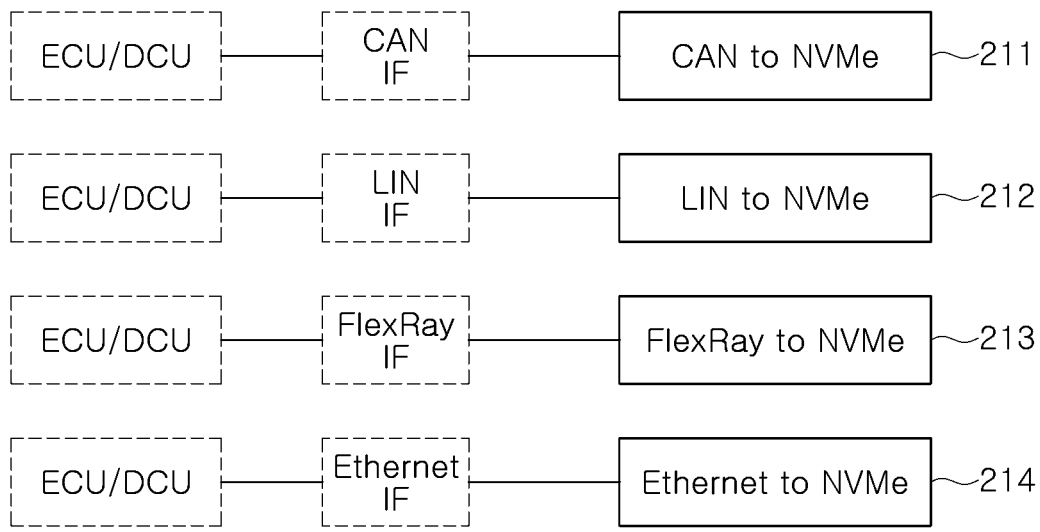
FIG. 2B is a diagram illustrating an interface converter 210, according to an embodiment.

FIG. 2B is a diagram illustrating an interface converter 210, according to an example embodiment. Referring to FIG. 2B, the interface converter 210 may include a first interface conversion unit 211, a second interface conversion unit 212, a third interface conversion unit 213, and a fourth interface conversion unit 214.

The first interface conversion unit 211 may be configured to convert a first vehicle communication interface CAN to a first interface NVMe. The second interface conversion unit 212 may be configured to convert the second vehicle communication interface LIN to the first interface NVMe. The third interface conversion unit 213 may be configured to convert the third vehicle communication interface (FlexRay) into the first interface NVMe. The fourth interface conversion unit 214 may be configured to convert the fourth vehicle communication interface (Ethernet) into the first interface NVMe.

The number and configuration of the interface conversion units depicted in FIG. 2B are provided as an example. In practice, the interface converter 210 may include fewer or additional interface conversion units than the ones shown in FIG. 2B. Alternatively or additionally, the interface conversion units may be configured to convert fewer, additional, or different interfaces than the interfaces described above with reference to FIG. 2B.

Figure 3:
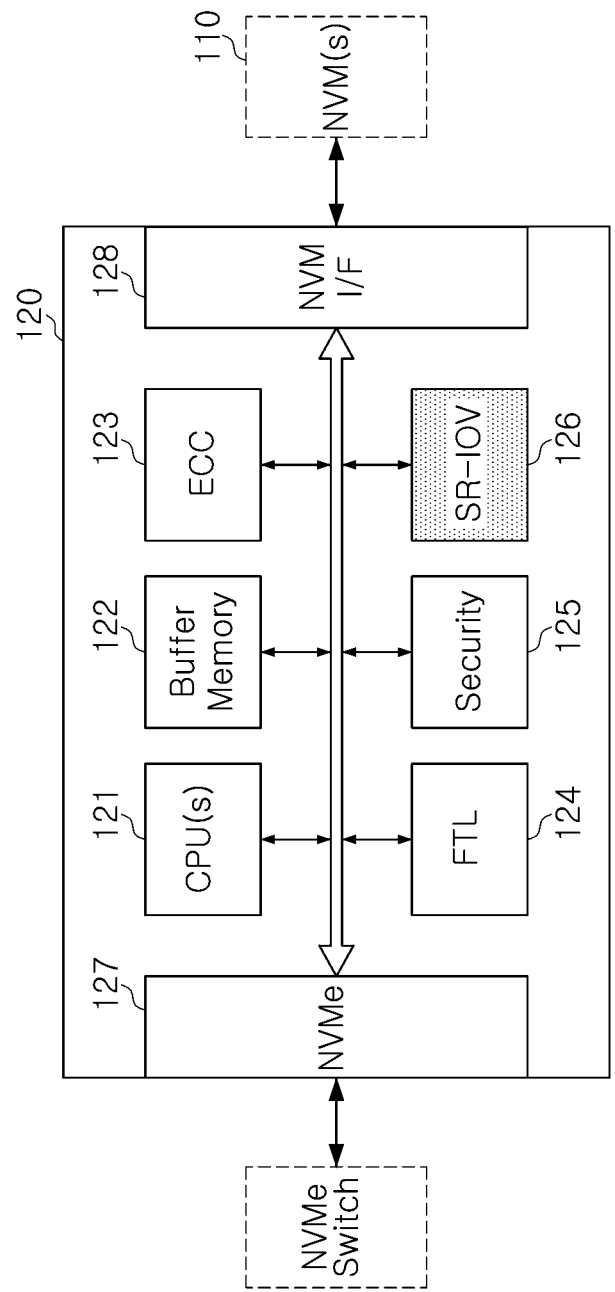
FIG. 3 is a diagram illustrating a controller 120, according to an embodiment.

FIG. 3 is a diagram illustrating a controller 120, according to an example embodiment. Referring to FIG. 3, the controller 120 may include at least one processor 121, a buffer memory 122, an error correction circuit 123, a flash translation layer manager 124, an encryption device 125, a virtualization function module 126, a host interface circuit 127, and a memory interface circuit 128.

In an embodiment, the at least one processor 121 (e.g., central processing units (CPU(s))) may be configured to control the overall operation of the centralized storage device 100. For example, the processor 121 may perform various management operations such as, but not limited to, cache/buffer management, firmware management, garbage collection management, wear leveling management, data deduplication management, read refresh/reclaim management, bad block management, multi-stream management, mapping of host data and non-volatile memory management, QoS management, system resource allocation management, non-volatile memory queue management, read level management, erase/program management, hot/cold data management, power loss protection management, dynamic thermal management, initialization management, RAID management and the like. These management operations may be implemented in terms of hardware/firmware/software or a combination thereof.

In an optional or additional embodiment, the processor 121 may be configured to manage a buffer area for storing temporary data in the non-volatile memory device 110 and a user area for copying data of the buffer area. The processor 121 may allocate and control a buffer space for storing temporary data.

The buffer memory 122 may be configured to temporarily store data to be written to the non-volatile memory device 110 and/or data read from the non-volatile memory device 110. In an example embodiment, the buffer memory 122 may be a component included in the controller 120. In another example embodiment, the buffer memory 122 may be disposed external of the controller 120. Alternatively or additionally, the buffer memory 122 may be implemented as a volatile memory (e.g., static random access memory (SRAM), dynamic RAM (DRAM), synchronous RAM (SDRAM), or the like) and/or a non-volatile memory (e.g., flash memory, PRAM, MRAM, RRAM, FRAM, and the like).

The error correction circuit 123 may be configured to generate an error correction code (ECC) during a program operation and/or to restore data using the ECC during a read operation. That is, the error correction circuit 123 may generate an ECC for correcting a fail bit and/or an error bit of data received from the non-volatile memory device 110. Alternatively or additionally, the error correction circuit 123 may form data to which parity bits are added by performing error correction encoding on data provided to the non-volatile memory device 110. The parity bits may be stored in the non-volatile memory device 110. In an embodiment, the error correction circuit 123 may perform error correction decoding on data output from the non-volatile memory device 110. In some embodiments, the error correction circuit 123 may correct errors using parity. Alternatively or additionally, the error correction circuit 123 may correct errors using coded modulation such as, but not limited to, Low Density Parity Check (LDPC) code, BCH code, turbo code, Reed-Solomon code, convolution code, Recursive Systematic Code (RSC), Trellis-Coded Modulation (TCM), Block Coded Modulation (BCM). In some embodiments, when the error correction circuit 123 is unable to correct errors on the data, a read retry operation may be performed.

The flash translation layer (FTL) manager 124 may perform various functions such as address mapping, wear-leveling, and garbage collection. The address mapping operation may refer to an operation including changing a logical address received from the host into a physical address used to physically store data in the non-volatile memory device 110. The wear-leveling function may refer to a technique for preventing excessive deterioration of a specific block by uniformly using blocks in the non-volatile memory device 110, and may be implemented through a firmware technique for balancing erase counts of physical blocks. The garbage collection function may refer to a technique for securing usable capacity in the non-volatile memory device 110 by copying valid data of a block to a new block and erasing the old block.

The encryption (security) device 125 may perform at least one of an encryption operation and a decryption operation on data input to the controller 120 using a symmetric-key algorithm. For example, the encryption device 125 may encrypt and/or decrypt data using an advanced encryption standard (AES) algorithm. The encryption device 125 may include an encryption module and a decryption module. In an example embodiment, the encryption device 125 may be implemented in terms of hardware/software/firmware or a combination thereof.

In some embodiments, the encryption device 125 may perform a self-encryption disk (SED) function and/or a trusted computing group (TCG) security function. The SED function may store encrypted data in the non-volatile memory device 110 using an encryption algorithm and/or may decrypt encrypted data from the non-volatile memory device 110. In an embodiment, the encryption/decryption operations may be performed using an internally generated encryption key. In an optional or additional embodiment, the encryption/decryption operations may be performed using an obtained encryption key. The TCG security function may provide a mechanism for enabling access control to user data of the centralized storage device 100. For example, the TCG security function may perform an authentication procedure between an external device and the centralized storage device 100. In an example embodiment, the SED function and/or the TCG security function may be optionally selectable.

The virtualization module 126 may be implemented to virtualize the centralized storage device 100 as a storage device that may be independently controllable by a plurality of hosts. That is, the virtualization module 126 may perform the SR-IOV function.

The host interface circuit 127 may be configured to transmit and receive packets with the host (ECU, DCU, see FIG. 2). A packet transmitted from the host to the host interface circuit 127 may include a command or data to be written to the non-volatile memory device 110. A packet transmitted from the host interface circuit 127 to the host may include a response to a command or data read from the non-volatile memory 110.

The memory interface circuit 128 may be configured to transmit data to be written to the non-volatile memory device 110 and/or to receive data read from the non-volatile memory device 110. In an embodiment, the memory interface circuit 128 may be implemented to comply with standard protocols such as, but not limited to, Joint Electron Device Engineering Council (JEDEC) Toggle or Open NAND Flash Interface (ONFI).

Figures 4, 5A:
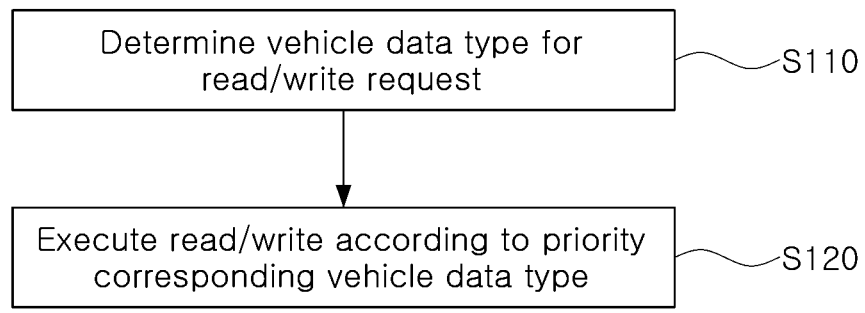

FIG. 4 is a flowchart illustrating a method of operating a centralized storage device 100, according to an example embodiment. Referring to FIGS. 2 to 4, the centralized storage device 100 may perform the operations described below.

The centralized storage device 100 may determine the type of vehicle data in response to a write request or read request from a host (e.g., ECU/DCU) (operation S110). The centralized storage device 100 may execute read/write operations according to the priority corresponding to the determined type of vehicle data (operation S120).

In an example embodiment, the type of vehicle data may include, but not be limited to, autonomous driving-related data, driving electronic control unit-related data, navigation data, gateway electronic control unit-related data, EDR data, infotainment data, or the like. In an optional or additional example embodiment, the type of vehicle communication interface may be determined using a tag included in a read request or a write request. In an optional or additional example embodiment, a security level corresponding to the type of vehicle data may be determined. In an optional or additional example embodiment, a storage target may be determined according to a security level. In an example embodiment, the EDR data may be stored in a SLC area, and data storage system for automated driving (DSSAD) data may be stored in a TLC area.

FIGS. 5A, 5B, and 5C are diagrams illustrating data management policies of the centralized storage device 100, according to an example embodiment.

Referring to FIG. 5A, a vehicle communication interface may be determined according to data requirements. For example, a CAN communication interface may be used in a circumstance in which low security and low speed may be required. Alternatively or additionally, an Ethernet communication interface may be used in a circumstance in which high security and high speed may be required.

Referring to FIG. 5B, data priority may be determined according to the type of vehicle data. For example, AV data may be assigned a highest priority (e.g. priority level 1). Alternatively or additionally, driving ECU data, navigation data, gateway ECU data, EDR data, and infotainment data may be assigned respective descending priority levels, with infotainment data being assigned the lowest priority (e.g., priority level 6).

Referring to FIG. 5C, a target area for storing the data in the centralized storage device 100 may be determined according to a security level. For example, when the security level is high, media may be used as a redundancy area. When the security level is medium, the SLC/TLC area of the centralized storage device 100 may be used as a redundancy area. When the security level is low, the TLC area may be used as a redundancy area. When the security level is not relevant, a redundancy operation may not be performed.

It is to be understood that the data management policies shown in FIGS. 5A to 5C are provided as examples. In practice, the centralized storage device 100 may determine the communication interface, the priority level, the storage target, and/or other data characteristics using fewer, additional, or different data management policies. For example, the data management policies shown in FIGS. 5A to 5C may have additional entries (e.g., additional interfaces, additional priority levels, and/or additional security levels) corresponding to the same and/or additional data requirements, vehicle data types, and/or storage targets shown in FIGS. 5A to 5C.

Figure 6:
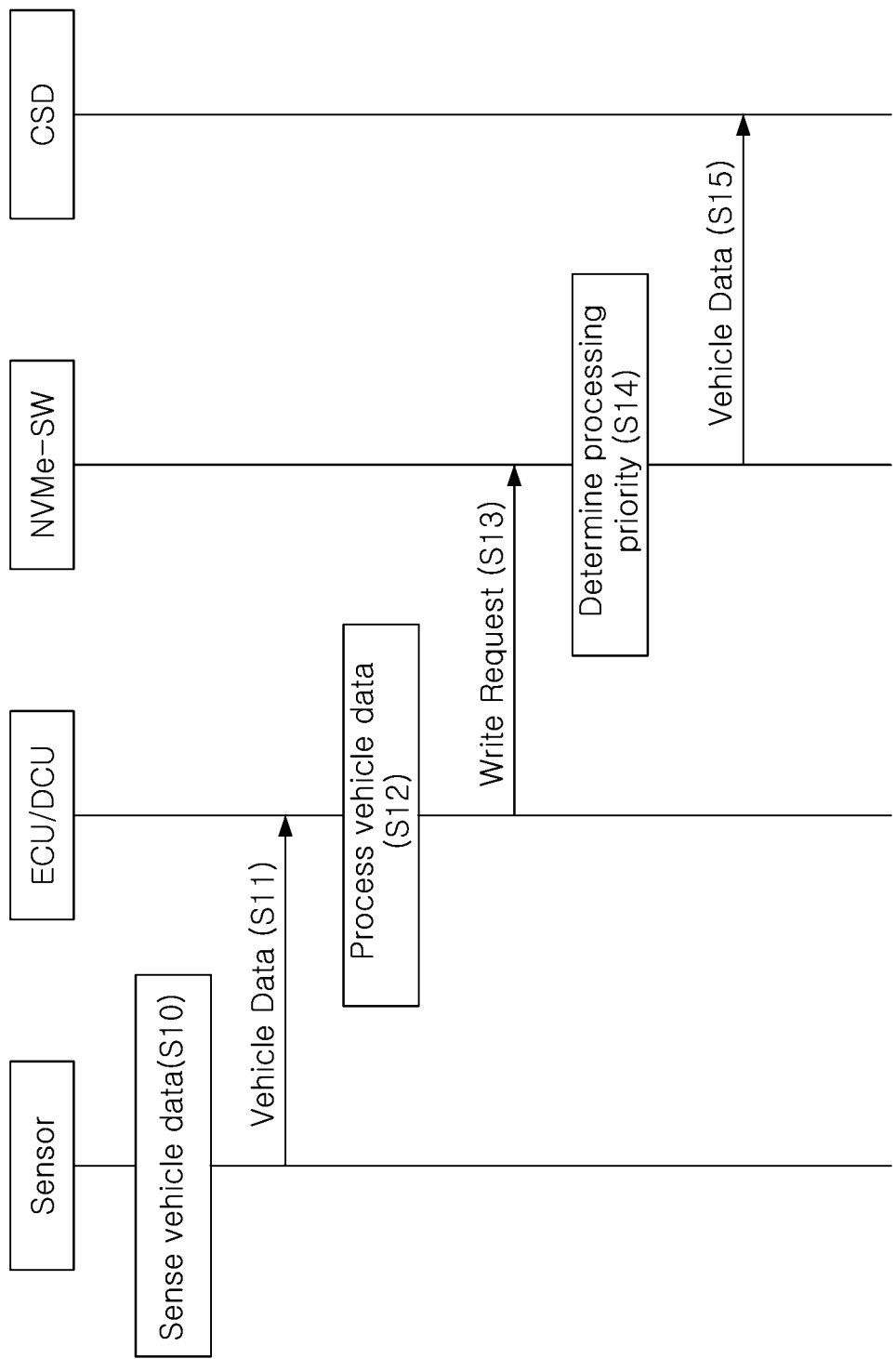
FIG. 6 is a ladder diagram illustrating a write operation of an in-vehicle electronic system 20, according to an embodiment.

FIG. 6 is a ladder diagram illustrating a write operation of an in-vehicle electronic system 20, according to an example embodiment. Referring to FIG. 6, the in-vehicle electronic system 20 may perform the operations described below as part of a write operation.

One of various sensors in the vehicle may sense (e.g., obtain) vehicle data (operation S10). The sensed vehicle data may be transmitted to an electronic control unit/domain control unit (ECU/DCU) (operation S11). The ECU/DCU may process the sensed vehicle data according to a predetermined method to store the data (operation S12). The processed vehicle data may be transmitted to an interface switch (NVMe-SW) through a vehicle communication interface. For example, the ECU/DCU may send a write request to the NWMe-SW (operation S13). The NVMe-SW may determine the priority of vehicle data processed according to the data management policy (S14). The NVMe-SW may transmit a write request to the centralized storage device CSD along with the processed data according to the priority (S15). The CSD may store vehicle data processed according to the write request.

Figure 7:
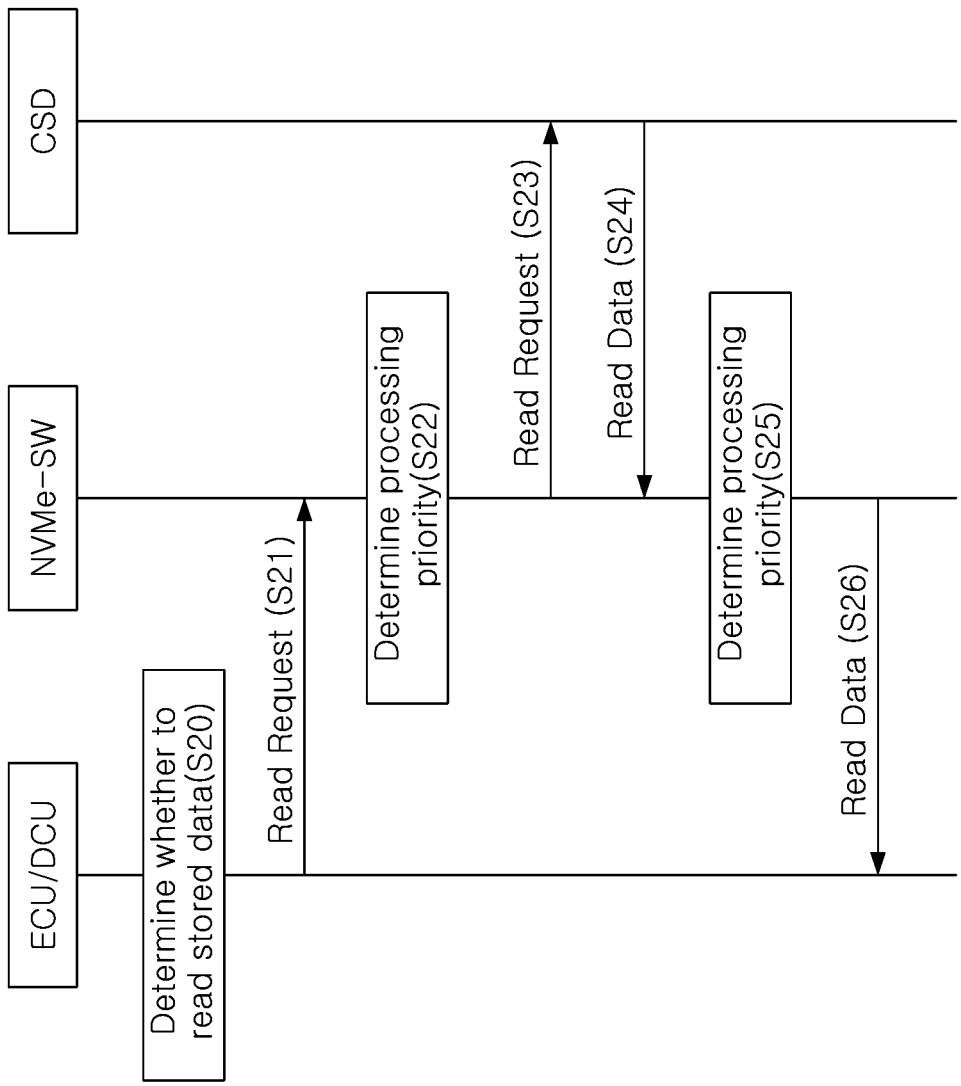
FIG. 7 is a ladder diagram illustrating a read operation of an in-vehicle electronic system 20, according to an embodiment.

FIG. 7 is a ladder diagram illustrating a read operation of an in-vehicle electronic system 20, according to an example embodiment. Referring to FIG. 7, the in-vehicle electronic system 20 may perform the operations described below as part of a read operation.

The electronic control unit/domain control unit (ECU/DCU) may determine whether to read data stored in the centralized storage device CSD when necessary (operation S20). For example, the ECU/DCU may determine to read data from the CSD based on a periodic and/or aperiodic operation, task, and/or instruction performed by the ECU/DCU and/or by a message and/or signal received by the ECU/DCU. Based on the determination to read the data from the CSD, the ECU/DCU may transmit a read request to the interface switch (NVMe-SW) (operation S21). The NVMe-SW may determine a processing priority corresponding to the read request (operation S22). For example, the NVMe-SW may determine the processing priority according to at least one data management policy. The NVMe-SW may transmit a read request to the CSD according to the determined processing priority (operation S23). The CSD may perform a read operation in response to the read request and may output read data corresponding to the read operation to the NVMe-SW (operation S24). The NVMe-SW may determine a processing priority for processing the transmitted read data (operation S25). NVMe-SW may transmit the read data to the ECU/DCU according to the processing priority (operation S26).

Typically, a SR-IOV interface supporting a plurality of application processes on a SSD may be used for a high-performance computing (HPC) application. For example, the SR-IOV interface may support multiple hosts through interface virtualization compared to a single PCIe, which may be preferred. As such, the use of an SR-IOV interface may be suitable for a data center and/or a server application which may need to support multiple threads. An automotive architecture may also need a centralized data storage device supporting multiple hosts/vehicle controllers to support over-the-air (OTA) and HPC for autonomous driving application. In addition, a centralized data storage device that may support vehicle communication via Ethernet and/or a controller area network (CAN), as well as, data storage of sensor data and OTA data updates through an existing host may be necessary.

Figure 8:
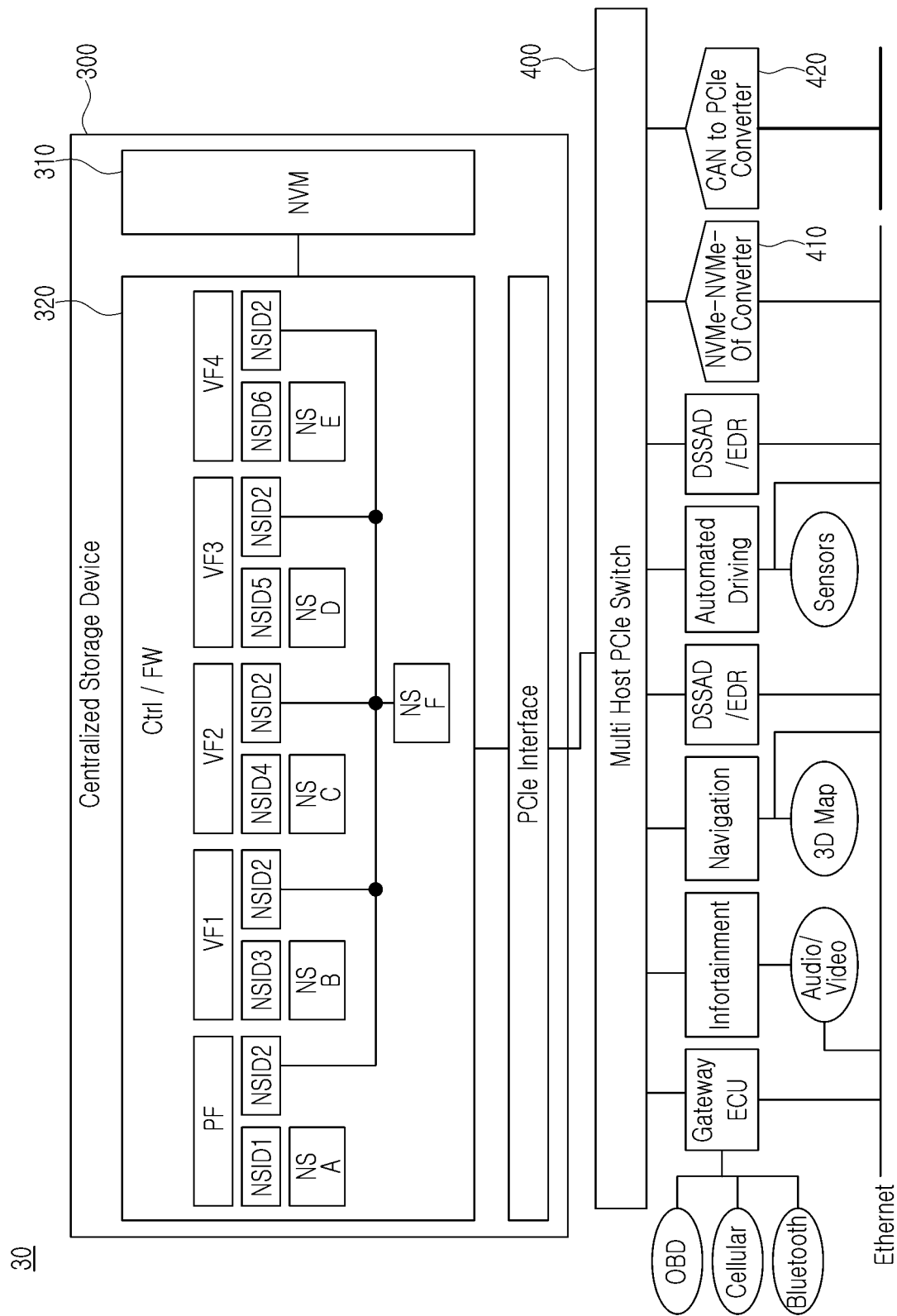
FIG. 8 is a diagram illustrating an in-vehicle electronic system 30 in which a SR-IOV technique is linked with a vehicle communication interface, according to an embodiment.

FIG. 8 is a diagram illustrating an in-vehicle electronic system 30 in which a SR-IOV technique is linked with a vehicle communication interface according to an example embodiment. The in-vehicle electronic system 30 of FIG. 8 may include or may be similar in many respects to at least one of the in-vehicle communication network 10 and the in-vehicle electronic system 20 described above with reference to FIGS. 1 and 2A, and may include additional features not mentioned above.

Referring to FIG. 8, the in-vehicle electronic system 30 may include a centralized storage device 300, a multi-host interface switch 400, and a plurality of vehicle controllers.

The centralized storage device 300 may be implemented in a structure in which domain architecture and zonal architecture may be applied to an E/E architecture of in vehicle application to which autonomous driving and advanced driver assistance system (ADAS) technologies may be applied. In an example embodiment, a portion of and/or the entirety of the vehicle communication protocols for the CAN bus may support Ethernet.

The centralized storage device 300 may perform a virtualization function to support a plurality of PCIe interfaces in SSD firmware for SR-IOV.

The multi-host interface switch 400 may include a switch for controlling a plurality of PCIe. For example, the multi-host interface switch 400 may include a non-volatile express over fabrics (NVMe-oF) converter 410 and a CAN to PCIe converter 420 to support a vehicle network. In an example embodiment, each of a plurality of vehicle controllers may be connected to the host interface switch 400. Alternatively or additionally, each of the plurality of vehicle controllers may perform a host function.

As shown in FIG. 8, each of the plurality of vehicle controllers may include a gateway ECU, an infotainment controller for controlling audio/video output, a navigation controller, a DSSAD/EDR controller, and an autonomous driving controller for controlling various sensors. In an embodiment, the gateway ECU may be wiredly or wirelessly connected to a diagnostic device (e.g., on-board diagnostics (OBD)), a mobile terminal (e.g., cellular), and/or a wireless device (e.g., Bluetooth). In an optional or additional example embodiment, the multi-host interface switch 400 may be implemented as an application specific integrated circuit (ASIC) and/or a field programmable gate array (FPGA). In an optional or additional example embodiment, the centralized storage device 300 may be configured to control the ECUs of a plurality of domain controllers by supporting the SR-IOV interface.

For example, the centralized storage device 300 may manage a transfer queue, a completion queue, a management queue, and/or a management completion queue. The centralized storage device 300 may include a buffer memory for storing the transfer queue, the completion queue, the management queue, and/or the management completion queue. The centralized storage device 300 may communicate with a plurality of vehicle controllers via the multi-host interface circuit 400. For example, the centralized storage device 300 may communicate with the multi-host interface circuit 400 through an interface (e.g., NVMe over PCI-express) through a physical layer based on a PCI-express interface. Alternatively or additionally, the multi-host interface circuit 400 may communicate with vehicle controllers through a network-based interface (e.g., NVMe-oF; NVMe over Fabrics) or a vehicle communication interface.

In an embodiment, the centralized storage device 300 may include a controller 320 (Ctrl/FW) for communicating with vehicle controllers through various types of physical layers. The first to fourth virtual functions (e.g., first virtual function VF1, second virtual function VF2, third virtual function VF3, and fourth virtual function VF4) may correspond to each of a plurality of vehicle controllers. For example, the first virtual function VF1 may correspond to a first NVMe controller configured to communicate with the first vehicle controller and to process a first command from the first vehicle controller. The second virtual function VF2 may correspond to a second NVMe controller configured to communicate with the second vehicle controller and to process a second command from the second vehicle controller. The third virtual function VF3 may correspond to a third NVMe controller configured to communicate with a third vehicle controller and to process a third command from the third vehicle controller. A fourth virtual function VF4 may point to a fourth NVMe controller configured to communicate with a fourth vehicle controller and to process a fourth command from the fourth vehicle controller.

The first to fourth virtual functions VF1-VF4 may perform an operation on the non-volatile memory device 310 based on a command from a corresponding vehicle controller. In an example embodiment, a non-volatile memory device may be managed in a logically separated namespace (NS). For example, each of the first to fourth virtual functions VF1-VF4 may perform an operation corresponding to a command with respect to a corresponding namespace.

The performance manager may control operations of the first to fourth virtual functions VF1-VF4 based on the levels of the first to fourth virtual functions VF1-VF4. For example, the performance manager may schedule physical functions to process commands among the first to fourth virtual functions VF1-VF4 based on the levels of the first to fourth virtual functions VF1-VF4. In an example embodiment, a single host may further manage a plurality of transmission queues and/or other command queues, and a single physical function PF processes a command for each of a plurality of transmission queues.

In an embodiment, an autonomous driving data storage device, which may include a plurality of interfaces (e.g. CAN and Ethernet, or the like) of a vehicle, may need to select from among a plurality of interfaces to transmit stored data to a vehicle network. To this end, the host may designate tags according to security and speed requirements when storing data. For example, in the case of storing vehicle diagnostic data requiring low data security and speed, a CAN interface having a low speed and weak security may be used when transmitting data from a storage device including information in a tag. For another example, for data having tags corresponding to high security and speed, such as firmware for OTA or autonomous driving data, an Ethernet interface having relatively high speed and high security may be used.

Alternatively or additionally, using SR-IOV and a plurality of vehicle interfaces in an example embodiment, a priority order may be assigned to data processing according to each data source in the case in which a delay occurs in data read/write RW operations. According to the priority order, a PCIe switch and/or an F/W operation may be performed first in data RW. For example, when the following priorities are determined in advance (e.g., AV>EDR>driving ECU (motor/battery)>navigation>gateway ECU>infotainment), data input/output may be determined in consideration of the priority order in the interface switch 400. That is, in an example embodiment, AV and EDR data may be preferentially processed. Alternatively or additionally, when data RW is processed by the firmware of the centralized storage device 300, and RW processing of a high-priority data source is requested, high priority may be provided to new data processing in the data processing queue.

FIG. 9 is a diagram illustrating requirements according to sources of vehicle data in a vehicle network, according to an example embodiment.

In some embodiments, autonomous vehicle data may be standardized. That is, data such as, but not limited to, sensor data, autonomous and other controller software, navigation maps, vehicle-to-everything (V2X) monitoring, and infotainment data, may be generated by an autonomous vehicle. In an embodiment, a portion of the autonomous vehicle data may be stored in non-volatile memory (NVM) according to a configuration of the storage device. Alternatively or additionally, a data storage device for autonomous driving development and verification may store autonomous driving sensor, software intermediate data, and/or V2X data. Furthermore, in the case of a centralized storage device used in an autonomous vehicle, a portion of autonomous driving sensors and software intermediate data for future learning, infotainment data, and/or user-related data may be stored.

Referring to FIG. 9, a security level of each portion of data may be selected in advance. Accordingly, a redundancy strategy of the data storage device may be differentiated by tagging the security level to the data. For example, a redundancy strategy for high security level data may include to store the data in multiple locations, which may include installing an additional flash memory. In the case of an intermediate security level, a redundancy strategy may indicate that data may be stored by dividing a same flash memory into an SLC area and a TLC area. Alternatively or additionally, a redundancy strategy for low security level data may include to store the data in the same TLC area and/or to store the data in a quad level cell (QLC) data area.

In an example embodiment, data storage and/or data read/write operations in flash memory may be differentiated in consideration of data characteristics of an autonomous vehicle. For example, expansion to a data storage device specialized for autonomous driving may be implemented by adding an ASIC, such as a smart SSD, and by actively performing data management performed by the host. The centralized storage device, in an example embodiment, may be perform data management and transmission in a manner that may satisfy the performance and QoS of autonomous driving data, as well as, performing a standardized technique such as SR-IOV.

The centralized storage device in an example embodiment may not be limited to an SR-IOV-based SSD. For example, a centralized storage device in an optional or additional example embodiment may be implemented with a separate ASIC providing a vehicle communication interface to a single interface.

Figure 10A:
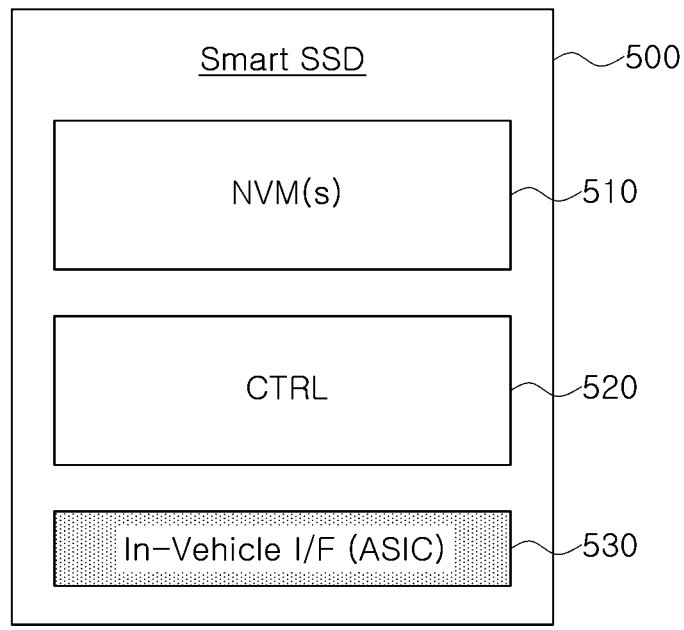
FIGS. 10A and 10B are diagrams illustrating a vehicle storage device 500, according to an embodiment.
Figure 10B:
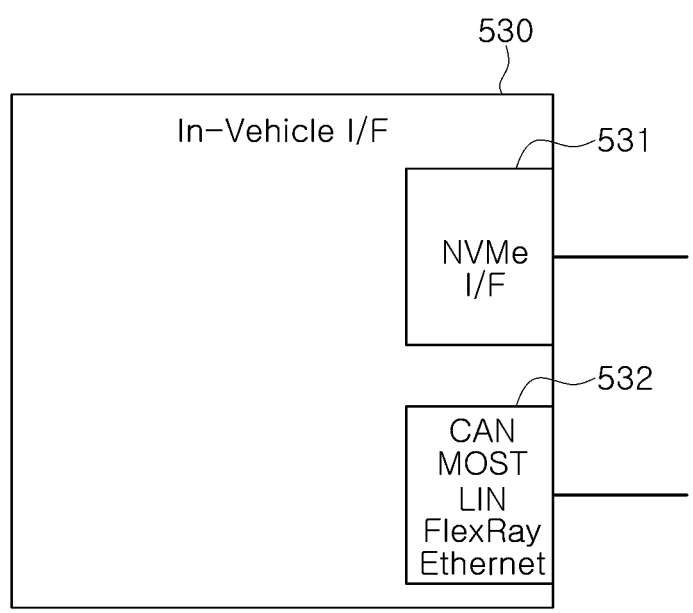

FIGS. 10A and 10B are diagrams illustrating a vehicle storage device 500, according to an example embodiment. Referring to FIG. 10A, a vehicle storage device 500 may include at least one non-volatile memory device 510, a controller 520, and an internal vehicle interface circuit 530.

The internal vehicle interface circuit 530 may be connected to external devices such as a host interface, as well as, vehicle communication interfaces dedicated to a vehicle. In an example embodiment, the host interface may be a NVMe interface. In an optional or additional example embodiment, the internal vehicle interface circuit 530 may be implemented as an ASIC.

Referring to FIG. 10B, the internal vehicle interface circuit 530 may include an NVMe interface circuit 531 and a vehicle communication interface circuit 532. In an example embodiment, the vehicle communication interface circuit 532 may be implemented as a CAN interface, a MOST interface, a LIN interface, a FlexRay interface, an Ethernet interface, or the like.

A vehicle storage device in an example embodiment may be implemented as a CAN transceiver and an Ethernet interface.

Figure 11:
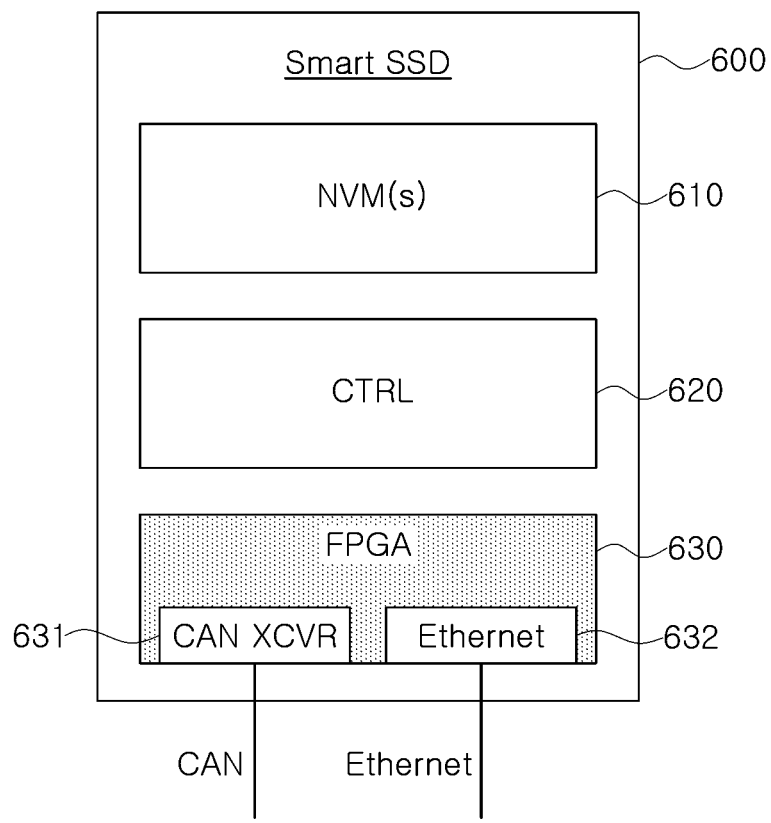
FIG. 11 is a diagram illustrating a vehicle storage device, according to an embodiment.

FIG. 11 is a diagram illustrating a vehicle storage device 600, according to an example embodiment. Referring to FIG. 11, a vehicle storage device 600 may include at least one non-volatile memory device 610, a controller 620 controlling the device 610, and an FPGA 630. The FPGA 630 may be connected to external vehicle controllers through a CAN interface and/or an Ethernet interface. For example, the FPGA 630 may include a CAN transceiver 631 and an Ethernet interface circuit 632.

In the vehicle storage device 600 of FIG. 11, the FPGA 630 may be disposed in the SSD, but the present disclosure is not limited thereto. For example, the FPGA 630 may be disposed externally of the smart SSD 600.

Figure 12:
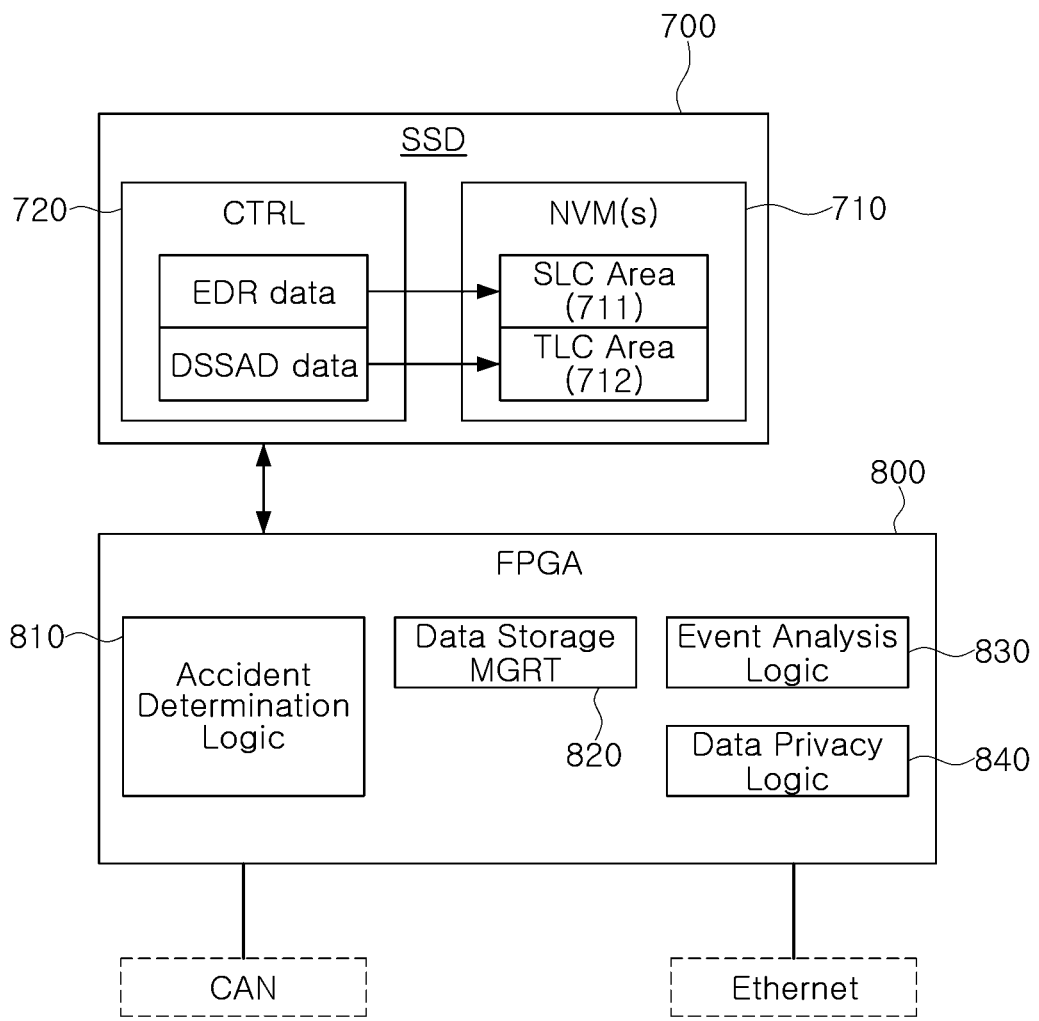
FIG. 12 is a diagram illustrating a vehicle storage system 40, according to an embodiment.

FIG. 12 is a diagram illustrating a vehicle storage system 40, according to an example embodiment. Referring to FIG. 12, the vehicle storage system 40 may include a storage device 700 and an FPGA 800.

The storage device 700 may include at least one non-volatile memory device 710 and a controller 720 controlling the at least one non-volatile memory device 710. The non-volatile memory device 710 may include an SLC area 7110 and a TLC area 712. The controller 720 may store EDR data in the SLC area 711 according to a data policy. The controller 720 may be configured to store DSSAR data in the TLC area 712 according to a data policy.

The FPGA 800 may receive vehicle data from the storage device 700 through a dedicated channel, and/or may output vehicle data to the storage device 700 through a dedicated channel. In an embodiment, the dedicated channel may be implemented as an NVMe interface. In an optional or additional embodiment, the vehicle data may include various sensor data needed for autonomous driving. In addition, the FPGA 800 may be connected to a plurality of vehicle controllers (e.g., ECU, DCU, or the like) through heterogeneous vehicle communication interfaces, as described above with reference to FIGS. 1 to 11. Alternatively or additionally, the FPGA 800 may process events using sensor data received from a plurality of vehicle controllers.

As shown in FIG. 12, the FPGA 800 may include an accident determination logic 810 configured to determine accidents through sensor data, a data storage management unit 820 configured to manage storage of sensor data, an event analysis logic 830 configured to interpret events according to sensor data, and a data protection logic 840 configured to perform an encryption operation to protect sensor data. In an embodiment, the FPGA 800 may be connected to an external vehicle controller through a CAN interface and an Ethernet interface. The accident determination logic 810 may determine occurrence of a vehicle accident and/or electric vehicle fire using vehicle data and/or an internal temperature sensor. Alternatively or additionally, the accident determination logic 810 may manage transmission of the data to an external cloud.

The data storage management unit 820 may store EDR and/or DSSAD data obtained from a vehicle communication channel. The event analysis logic 830 may compress data within an event recoverable range when storage space is insufficient. The data protection logic 840 may anonymize privacy information (e.g., face, license plate number, or the like) of image data.

Figure 13:
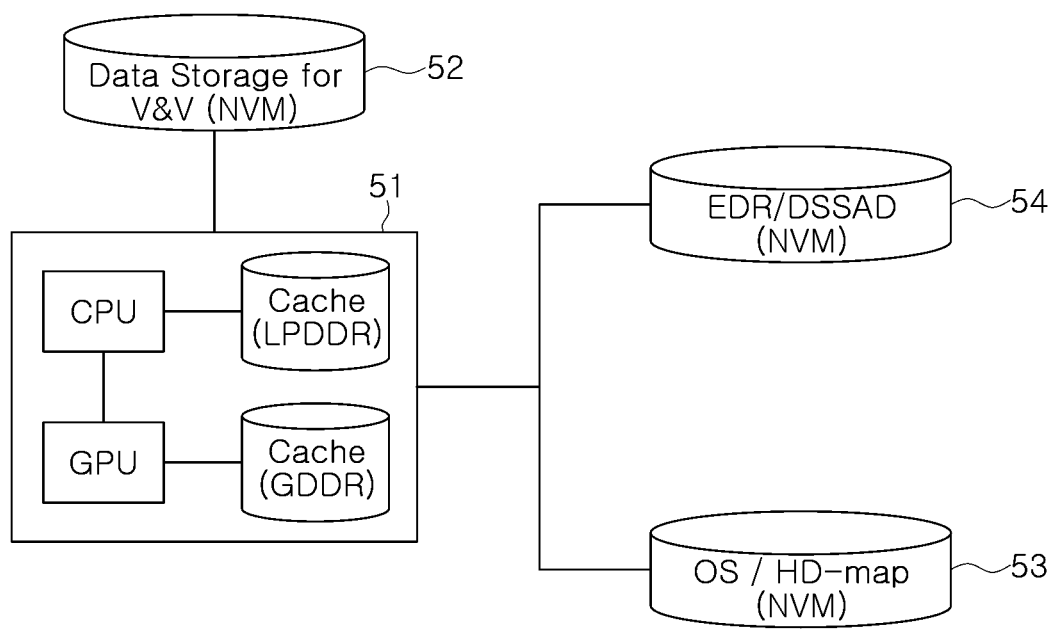
FIG. 13 is a diagram illustrating an autonomous driving electronic system 50, according to an embodiment.

FIG. 13 is a diagram illustrating an autonomous driving electronic system 50, according to an example embodiment.

Referring to FIG. 13, an autonomous driving electronic system 50 may include a processor 51 and storage devices (e.g., first storage devices 52, second storage devices 53, and data recording devices 54). The data recording devices 54, such as event data recorder (EDR) and data storage system for automated driving (DSSAD), which may be needed for conditional and/or fully autonomous driving of level 3 or higher, may require fast data storage without going through a host to record accidents and events. In this case, an example embodiment may be expanded when storing at high speed in an SSD supporting CAN and Ethernet. The example embodiment may also be applied to applications which may satisfy the computing performance of artificial intelligence (AI) by installing a plurality of controllers in the SSD when performance is prioritized, such as in the case of computing an AI algorithm of an autonomous vehicle.

Development of autonomous vehicles may need to implement data storage for verification of autonomous vehicles. When these data storage devices are need to store substantial amounts of data with significant bandwidth for accurate analysis of autonomous driving functions, an SSD supporting vehicle communication protocols may be applied to correspond to data from multiple sensors and controllers.

Figure 14:
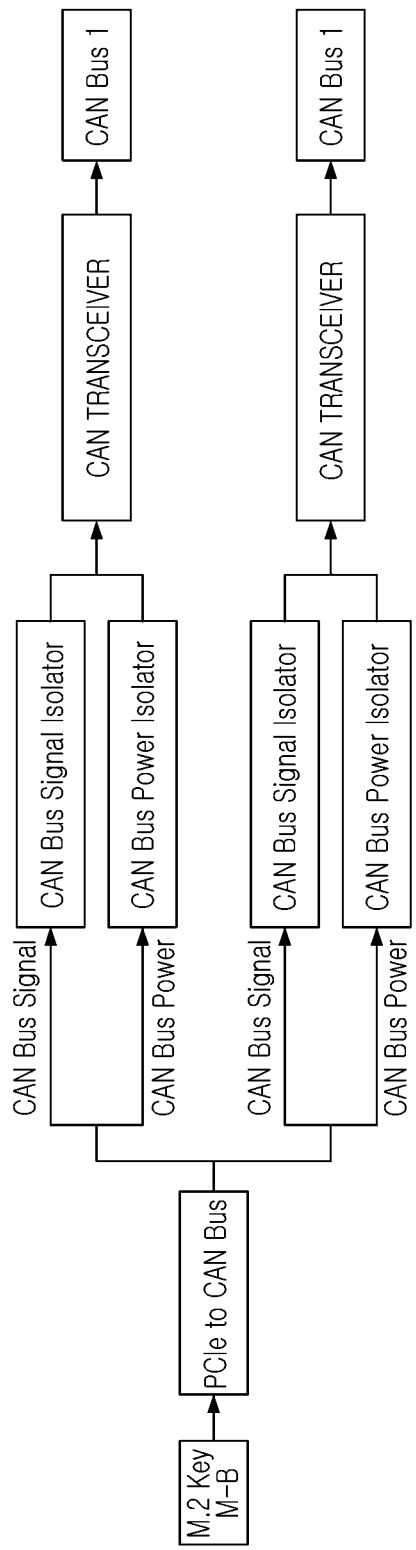
FIG. 14 is a diagram illustrating a Controller Area Network (CAN) to Peripheral Component Interconnect express (PCIe) data conversion, according to an embodiment.

FIG. 14 is a diagram illustrating CAN to PCIe data conversion, according to an example embodiment. In FIG. 14, two CAN bus port modules branching to the M.2 Key interface (e.g., PCIe interface) are shown. Data corresponding to the PCIe interface may be converted into data corresponding to the CAN bus. In this case, the CAN bus signal and CAN bus power may be separated. The CAN bus signal may be output to the CAN transceiver through the CAN bus signal isolator and the CAN bus power signal may be output to the CAN transceiver through the CAN bus isolator. The CAN transceiver may receive and/or output the separated CAN bus signal and/or CAN bus power to the corresponding CAN bus.

The example embodiment may applied to a vehicle interface, as well as, to a multi-host based system.

Figure 15:
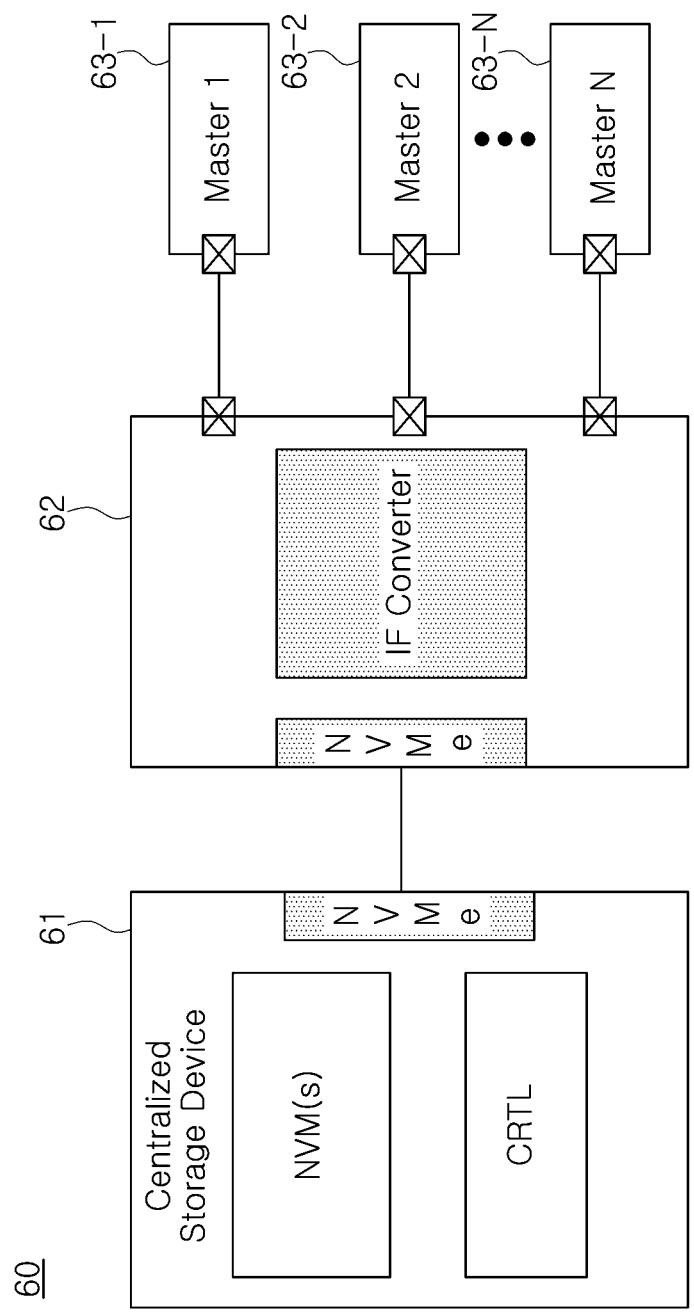
FIG. 15 is a diagram illustrating a cloud storage system, according to an embodiment.

FIG. 15 is a diagram illustrating a cloud storage system, according to an example embodiment. Referring to FIG. 15, the cloud storage system 60 may include a centralized storage device 61, a multi-host interface switch 62, and a plurality of masters (e.g., first master 63-1, second master 63-2, . . . , N-th master 63-N, hereinafter "63" generally, and where N is positive integer greater than one). In an embodiment, at least two masters of the plurality of masters 63 may be connected to the multi-host interface switch 62 through different communication interfaces. That is, the centralized storage device 61 may directly communicate with the multi-host interface switch 62 through at least one interface, such that the centralized storage device 61 may perform a function of communicating with a plurality of masters 63, through different communication interfaces.

The centralized storage device in an example embodiment may be implemented as a redundant storage device.

Figure 16:
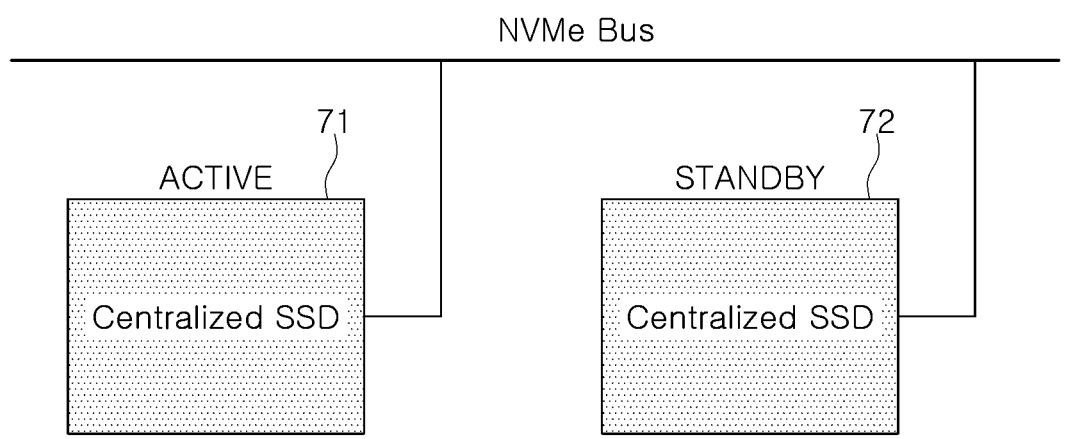
FIG. 16 is a diagram illustrating a redundant storage device system 70, according to an embodiment.

FIG. 16 is a diagram illustrating a redundant storage device system 70, according to an example embodiment. Referring to FIG. 16, a first centralized storage device 71 and a second centralized storage device 72 may be connected to the NVMe bus. When the first centralized storage device 71 operates in an active mode, the second centralized storage device 72 may operate in a standby mode.

The example embodiment discloses a centralized data storage device supporting vehicle communication (Ethernet and CAN). The centralized data storage device in the example embodiment may be implemented as SR-IOV and vehicle interfaces (Ethernet and CAN). The centralized data storage device in the example embodiment may differentiate in-vehicle protocols in consideration of autonomous driving data characteristics when storing data.

According to the aforementioned example embodiments, the centralized storage device, the in-vehicle electronic system having the centralized storage device, and the method of operating the centralized storage device may optimize data transmission by distinguishing data communication (e.g., Ethernet vs. CAN) in consideration of the characteristics of standardized vehicle data.

At least one of the components, elements, modules and units (collectively "components" in this paragraph) represented by a block in the drawings described above may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) a microprocessor, or the like that performs the respective functions.

While the example embodiments have been illustrated and described above, it is to be apparent to those skilled in the art that modifications and variations could be created without departing from the scope of the present disclosure as defined by the appended claims.

What is claimed is:

1. An in-vehicle electronic system, comprising:
 a centralized storage device; and
 an interface switch coupled to the centralized storage device through a first interface, coupled to at least one domain control unit (DCU) through a first vehicle communication interface, and coupled to at least one electronic control unit (ECU) through a second vehicle communication interface,
 wherein the interface switch comprises:
   an interface circuit configured to communicate according to the first interface; and
   an interface converter configured to:
     convert the first vehicle communication interface into the first interface, according to a first priority level of the first vehicle communication interface; and
     convert the second vehicle communication interface into the first interface, according to a second priority level of the second vehicle communication interface, the second priority level being different from the first priority level.

2. The in-vehicle electronic system of claim 1, wherein the first interface comprises a Non-Volatile Memory express (NVMe) interface.

3. The in-vehicle electronic system of claim 1, wherein each of the first vehicle communication interface and the second vehicle communication interface comprises at least one of a controller area network (CAN) interface, a CAN with flexible data rate (CAN-FD) interface, a local interconnect network (LIN) interface, a FlexRay interface, a media oriented systems transport (MOST) interface, and an Ethernet interface.

4. The in-vehicle electronic system of claim 1, wherein the interface converter comprises:
 a first interface conversion unit configured to convert a controller area network (CAN) interface into a Non-Volatile Memory express (NVMe) interface;
 a second interface conversion unit configured to convert a local interconnect network (LIN) interface into the NVMe interface;
 a third interface conversion unit configured to convert a FlexRay interface into the NVMe interface; and
 a fourth interface conversion unit configured to convert an Ethernet interface into the NVMe interface.

5. The in-vehicle electronic system of claim 1, wherein the centralized storage device is configured to:
 determine a type of vehicle data in response to receipt of a memory access request of the vehicle data, the memory access request comprising at least one of a read request and a write request; and
 perform a memory access operation corresponding to the memory access request, according to a priority corresponding to the type of the vehicle data.

6. The in-vehicle electronic system of claim 1, wherein the centralized storage device is configured to:
 determine a first storage target for first vehicle data having a first security level; and
 determine a second storage target for second vehicle data having a second security level,
 wherein the first security level is different from the second security level, and
 wherein the first storage target is different from the second storage target.

7. The in-vehicle electronic system of claim 1, wherein the centralized storage device is configured to:
 perform a single root-input output virtualization (SR-IOV) function.

8. The in-vehicle electronic system of claim 1, wherein the interface switch is configured to:
 assign, according to a first type of the first vehicle communication interface, a first security level to first vehicle data received through the first vehicle communication interface;
 assign, according to a second type of the second vehicle communication interface, a second security level to second vehicle data received through the second vehicle communication interface, the second type of the second vehicle communication interface being different from the first type of the first vehicle communication interface, and the second security level being different from the first security level;
 process the first vehicle data at a first processing speed, the first processing speed having been determined according to the first type of the first vehicle communication interface; and
 process the second vehicle data at a second processing speed, the second processing speed having been determined according to the second type of the second vehicle communication interface, the second processing speed being different from the first processing speed.

9. The in-vehicle electronic system of claim 1, wherein the interface switch is configured to:
 receive a write request from at least one of the at least one ECU and the at least one DCU;
 determine a priority corresponding to vehicle data comprised by the write request; and
 transmit, to the centralized storage device, the write request according to the priority.

10. The in-vehicle electronic system of claim 1, wherein the interface switch is configured to:
 receive a read request from at least one of the at least one ECU and the at least one DCU;
 determine a priority corresponding to the read request; and
 transmit, to the centralized storage device, the read request according to the priority.

11. A centralized storage device, comprising:
 at least one non-volatile memory (NVM) device; and
 a controller configured to control the at least one NVM device,
 wherein the controller is further configured to:
  receive, through a single root-input output virtualization (SR-IOV) function, first data from at least one electronic control unit (ECU) coupled to respective interfaces of a plurality of vehicle communication interfaces comprising a first vehicle communication interface having a first priority level and a second vehicle communication interface having a second priority level different from the first priority level; and
  transmit, through the SR-IOV function, second data to the at least one ECU coupled to the respective interfaces of the plurality of vehicle communication interfaces, according to priority levels of the respective interfaces of the plurality of vehicle communication interfaces, and
 wherein the controller is coupled to an external device through an NVM express (NVMe) interface.

12. The centralized storage device of claim 11, wherein the controller is further configured to:
 determine a type of vehicle data corresponding to a memory access request of the at least one ECU, the memory access request comprising at least one of a read request and a write request; and
 perform a memory access operation corresponding to the memory access request according to a priority corresponding to the type of the vehicle data.

13. The centralized storage device of claim 12, wherein the controller is further configured to:
 determine a first priority of autonomous driving-related data to be higher than a second priority of driving electronic control unit-related data.

14. The centralized storage device of claim 11, wherein the controller is further configured to:
 differentiate a storage target of the at least one NVM device, according to a security level.

15. The centralized storage device of claim 14, wherein the controller is further configured to:
 determine a first security level of data stored in a single level cell (SLC) area of the at least one NVM device to be higher than a second security level of data stored in a triple level cell (TLC) area of the at least one NVM device.

16. A method of operating a centralized storage device, the method comprising:
   determining a type of vehicle data corresponding to a memory access request received from an external device through to a first interface, the memory access request comprising at least one of a read request and a write request; and
   executing a memory access operation according to a priority corresponding to the type of the vehicle data,
   wherein the type of the vehicle data comprises at least one of autonomous driving-related data, driving electronic control unit-related data, navigation data, gateway electronic control unit-related data, event data recorder (EDR) data, and infotainment data.

17. The method of claim 16, wherein the determining of the type of the vehicle data comprises determining an interface type of a vehicle communication interface based on a tag comprised by the memory access request.

18. The method of claim 16, further comprising:
   determining a security level corresponding to the type of the vehicle data.

19. The method of claim 18, further comprising:
   determining a storage target according to the security level.

20. The method of claim 18, further comprising:
   storing event data recorder (EDR) data in a single level cell (SLC) area; and
   storing data storage system for automated driving (DS-SAD) data in a triple level cell (TLC) area.

* * * * *